United States Patent [19]

Maciolek et al.

[11] 3,746,279

[45] July 17, 1973

[54] MULTI-LIFT AIRCRAFT CONTROL SYSTEM

[75] Inventors: Joseph R. Maciolek, Newtown; John J. Wallace, Winsted, both of Conn.

[73] Assignee: United Aircraft Corporation, East Hartford, Conn.

[22] Filed: Aug. 2, 1971

[21] Appl. No.: 168,219

[52] U.S. Cl. ............... 244/2, 244/17.13, 244/77 D
[51] Int. Cl. ... B64c 37/02, B64c 11/44, B64c 27/70
[58] Field of Search ............... 235/150.2, 183, 197; 244/2, 77 R, 77 D, 77 V, 84, 17.13; 307/229; 318/489, 584, 585

[56] References Cited
UNITED STATES PATENTS

| | | | |
|---|---|---|---|
| 3,656,723 | 4/1972 | Piasecki et al. | 244/2 |
| 3,071,335 | 1/1963 | Carter, Jr. | 244/77 R |
| 2,721,044 | 10/1955 | Young | 244/2 |
| 2,730,398 | 1/1956 | Huested | 244/2 X |
| 3,584,814 | 6/1971 | Murphy | 244/77 D |

*Primary Examiner*—Milton Buchler
*Assistant Examiner*—Stephen G. Kunin
*Attorney*—Melvin Pearson Williams

[57] ABSTRACT

A single load is suspended from vertical cables extending beneath each of two direct lift type of aircraft, the cables being separated by a spreader bar. A trailing, slave aircraft flys behind, above, and to one side of a leading, master aircraft, with the spreader bar extending at an angle to the heading of the aircraft, in a plane below them. The lead pilot control provides overall, or outer loop control of the lead aircraft, and the controls of the lead aircraft are electromechanically coupled to operate the controls of the trailing aircraft, whereby the lead pilot controls the outer loop of both aircraft. The inner or stability loop of the controls of each aircraft are modified so as to utilize inputs from the inertial system of the related aircraft and inputs relating to the manner in which the load extends below the aircraft, to both stabilize the load with respect to each aircraft, and to maintain the trail aircraft in a proper position with respect to the lead aircraft and the load. Specifically, the cables from each aircraft supporting the spreader bar are maintained substantially perpendicular with respect to the spreader bar thereby to maintain substantially equal loading of each aircraft; pitch and roll inertial sensors in each aircraft, and the angle of each cable with respect to its aircraft in both the pitch and roll directions, are utilized in the respective aircraft to stabilize that aircraft with respect to the load, thereby to prevent wiggling of the load; the heading of the load itself and of each aircraft, together with desired formation inputs, are utilized to control the heading of the trailing aircraft, and to provide pitch and roll inputs to control relative position of the trailing aircraft with respect to the leading aircraft so as to maintain a desired formation in flight.

12 Claims, 18 Drawing Figures

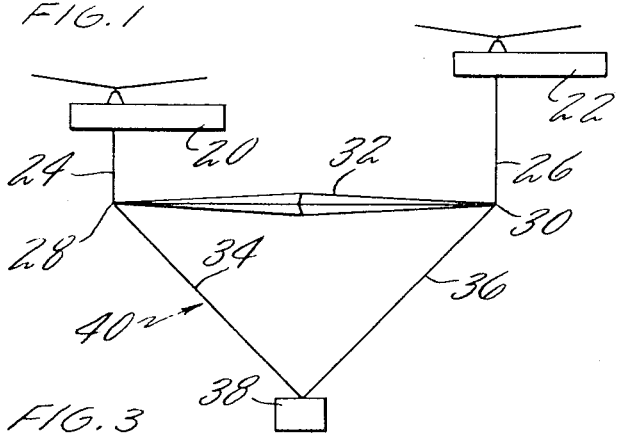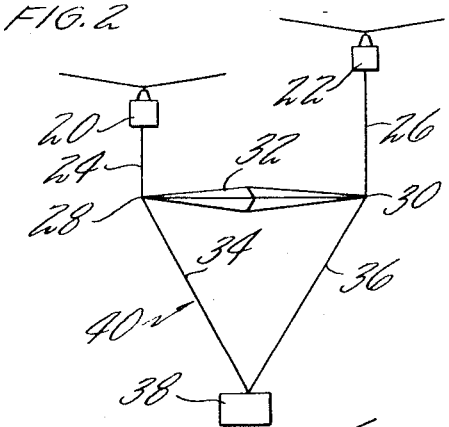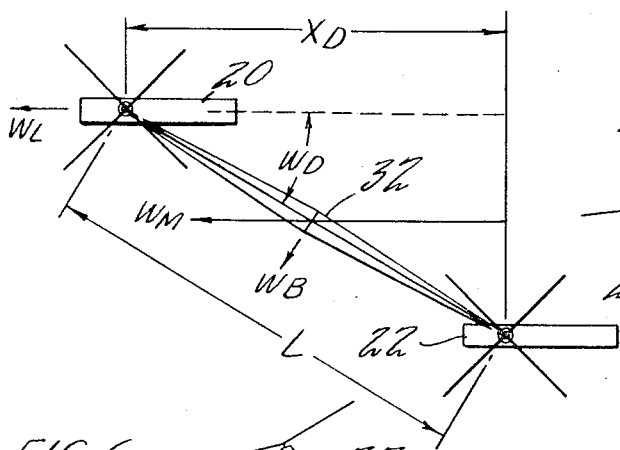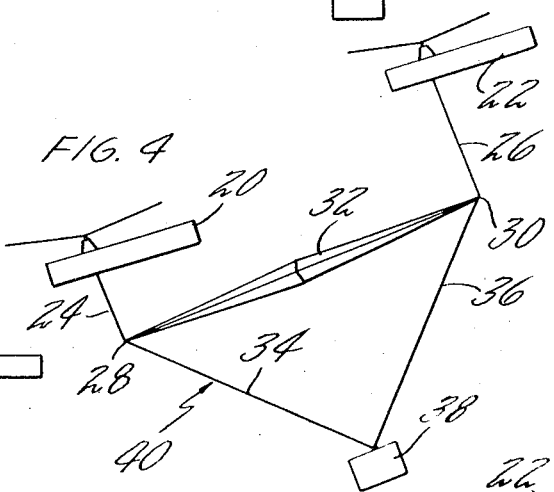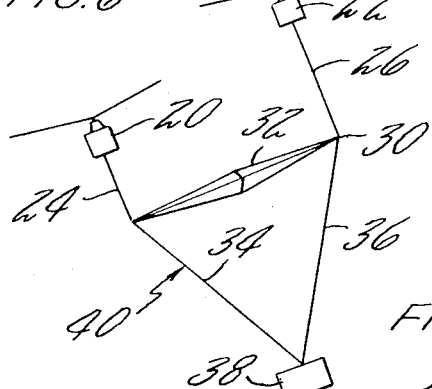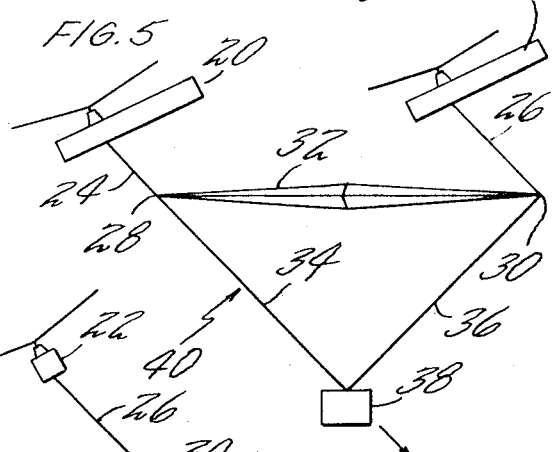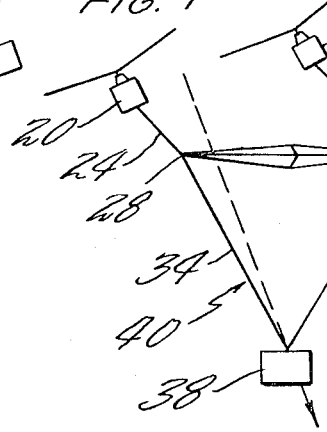

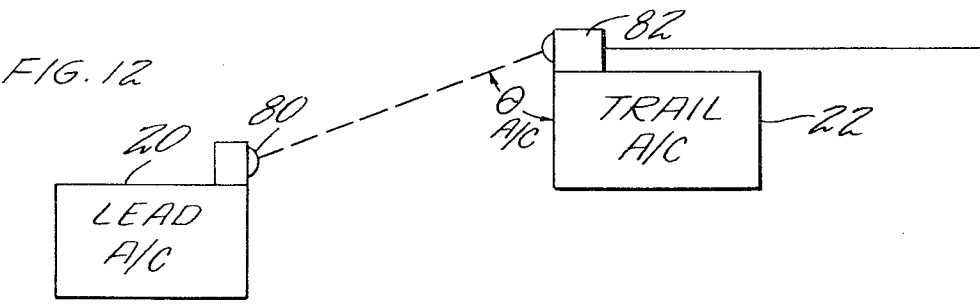
FIG. 12
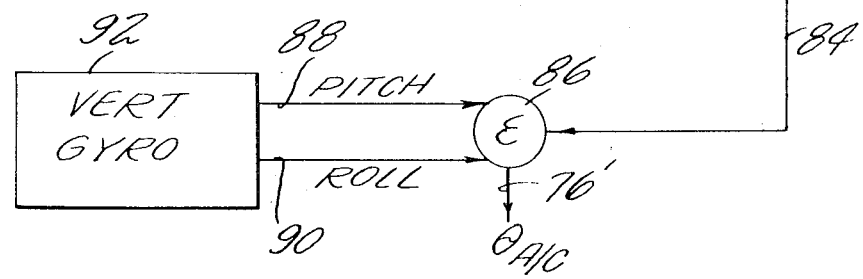
FIG. 17 SINGLE AIRCRAFT (PRIOR ART)
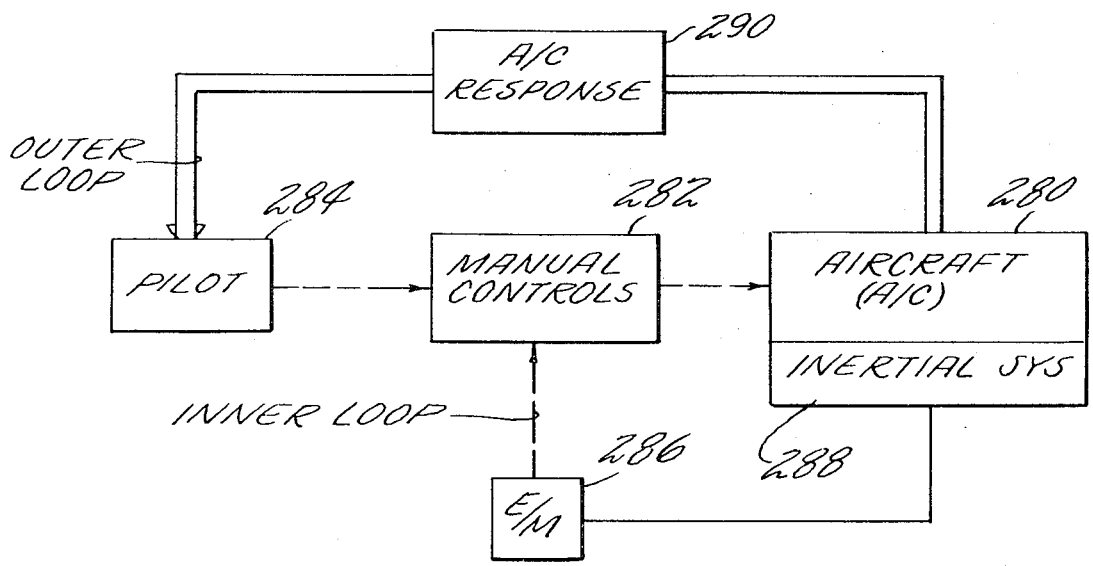

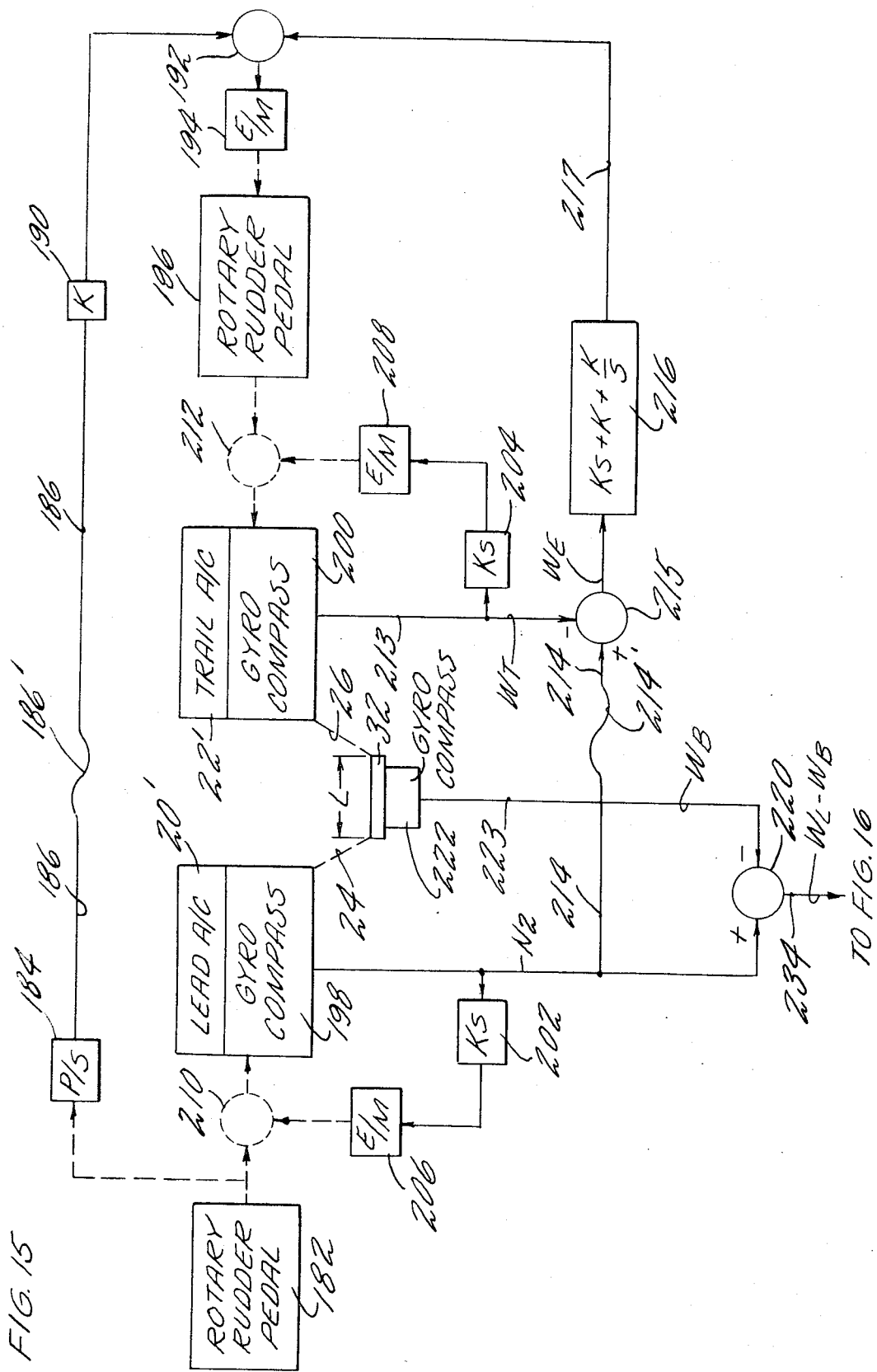

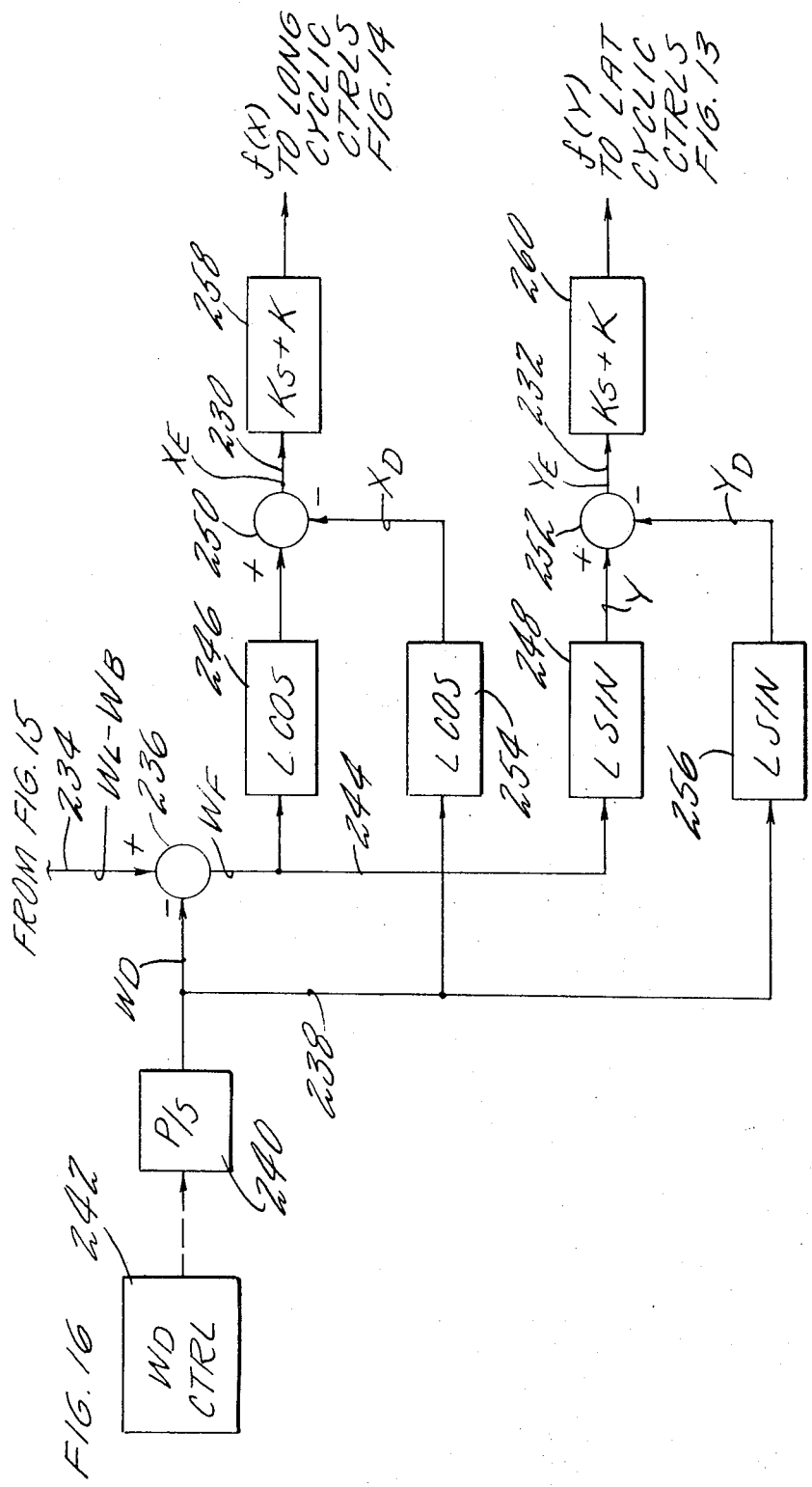

MULTI-LIFT AIRCRAFT CONTROL SYSTEM

BACKGROUND OF THE INVENTION

1. Field of Invention

This invention relates to control systems for aircraft, and more particularly to a multi-lift, master/slave aircraft control system.

2. Description of the Prior Art

Utilization of direct lift-type of aircraft, such as helicopters, has recently been expanded to include heavy lift operations, in the nature of a crane in the sky. Naturally, the load that can safely be supported by an individual aircraft approaches limitations asymptotically in the sense that lifting of a greater load requires stronger support mechanisms, larger engines, more fuel, and a larger aircraft in general; the weight of the aircraft therefore increases in proportion to the weight of the load which it is to lift.

One solution to this problem which has been proposed in the prior art is to utilize a plurality of aircraft, in common, to jointly support a load. One such system known to the art simply provides for the suspension of a spreader bar between two cables extending below two completely independent aircraft, the load being suspended from cables attached to the ends of the spreader bar. In this system, each aircraft is completely independently controlled by the pilots thereof, with no commonality of control between the aircraft, other than visual observations of the relative positions and attitudes of each aircraft with respect to each other and with respect to the load. However, it has been found that such systems readily attain, even in a simple hovering maneuver, shift in the amount of load supported by each aircraft of 10 percent of the load or more, on a regular basis. When the aircraft are turning, accelerating, decelerating, or most particularly gaining or losing altitude, the amount of load shifted from one aircraft to the other can easily approach 50 percent. When it is considered that either aircraft could carry a load half as great all by itself, and the need for a dual lift system is to carry loads in excess of those which can be sustained by a single aircraft, it is quite obvious that a shift of any substantial fraction of the load (in excess of 50 percent of the load) to a single aircraft is unsatisfactory.

Another type of system known to the art is the interconnection of two or more aircraft through a rigid load carrying member, pilot control over one aircraft causing, by mechanical interconnection, common control of the other aircraft. However, this system provides severe limitations on the independent movement of each of the aircraft, rendering the maneuvering thereof extremely difficult and dangerous, and providing severe limitations upon the rates of change of position which may be achieved through maneuvering of the aircraft. Additionally, since the operation of any one aircraft causes an identical input in the other aircraft, it is impossible to maintain relative formation while changing heading or altitude; instead, all aircraft must exhibit the same elevation and heading changes at the same moment. This means that only flank type motions can be achieved by the formation, and no column-type motions can be achieved by the formation. The relative position of each aircraft in the formation is changed as a result of any changes in heading of the group. In addition, since no two aircraft are exactly alike, the response to a given control input will not be exactly alike; therefore each aircraft is liable to exhibit a loading effect as a result of a different response to a given command in any of the other aircraft. This results in further dangerous and possibly catastrophic conditions, rendering the utilization of such a system inadvisable.

SUMMARY OF INVENTION

The object of the present invention is to provide an improved multiple lift aircraft control system.

In accordance with one aspect of the present invention, a plurality of aircraft suspend a load by mechanically-spread cables extending beneath each aircraft; pilot control over one of the aircraft not only provides outer loop (or overall) control over the aircraft, but through electro-mechanical coupling provides control over the outer loop of the other aircraft. In further accord with the present invention, the inner loop (or stability) control of each aircraft is modified to provide stability of each aircraft with respect to the load and each other.

In accordance with another aspect of the present invention, in a system in which a load is supported by mechanically spread cables extending beneath each of a plurality of direct lift type of aircraft, the difference of a pair of angles between the mechanical cable spreading means and the cable relating to a respective pair of the aircraft is utilized to control direct lift of one of the aircraft, thereby tending to maintain the cable load of that aircraft substantially normal to the total force field exerted on the spreader means as a result of gravity and accelerations due to speed up, slow down or turns.

In accordance with still another aspect of the present invention, relative heading of the master aircraft and the load is utilized to control position of a slave aircraft in a multi aircraft load lifting system, thereby tending to maintain a desired formation of the supporting aircraft with respect to the load.

The present invention provides a relatively simple, stable and safe system for controlling a plurality of aircraft with respect to a common load. The invention provides not only for control of slave aircraft in response to maneuvering of a master aircraft, but also provides load stability control over all of the aircraft. The invention permits independent (though related) maneuvering of each of the aircraft while maintaining a stable load, and permits maneuvering all of the aircraft in a relative formation in a wide range of maneuvers.

Aspects of the invention may be used separately, in low cost, partially-automated control systems.

Other objects, features and advantages of the present invention will become more apparent in the light of the following detailed description of preferred embodiments thereof, as illustrated in the accompanying drawing.

BRIEF DESCRIPTION OF THE DRAWING

FIG. 1 is a simplified side view illustration of a dual helicopter lift operation while hovering;

FIG. 2 is a simplified front view illustration of a dual helicopter lift operation while hovering;

FIG. 3 is a simplified top view illustration of a dual helicopter lift operation while hovering;

FIG. 4 is a simplified side view illustration of a dual helicopter lift operation in correctly-executed forward flight;

FIG. 5 is a simplified side view illustration of a dual helicopter lift operation in incorrectly executed forward flight;

FIG. 6 is a simplified front view illustration of a dual lift helicopter operation correctly executing a turn to starboard;

FIG. 7 is a simplified front view illustration of a dual lift helicopter operation incorrectly executing a turn to starboard;

FIG. 12 is a simplified, partial schematic block diagram of another embodiment of an angle sensor which may be utilized in the embodiment of FIG. 8, in accordance with the invention;

FIG. 15 is a schematic block diagram of heading controls which may be used in an embodiment of the present invention;

FIG. 16 is a schematic block diagram of position controls used in conjunction with the lateral and longitudinal cyclic controls illustrated in FIGS. 13 and 14, in accordance with the invention;

FIG. 17 is a simplified schematic block diagram illustrating concepts of single aircraft control known to the prior art.

DESCRIPTION OF THE PREFERRED EMBODIMENT

Figure 8:
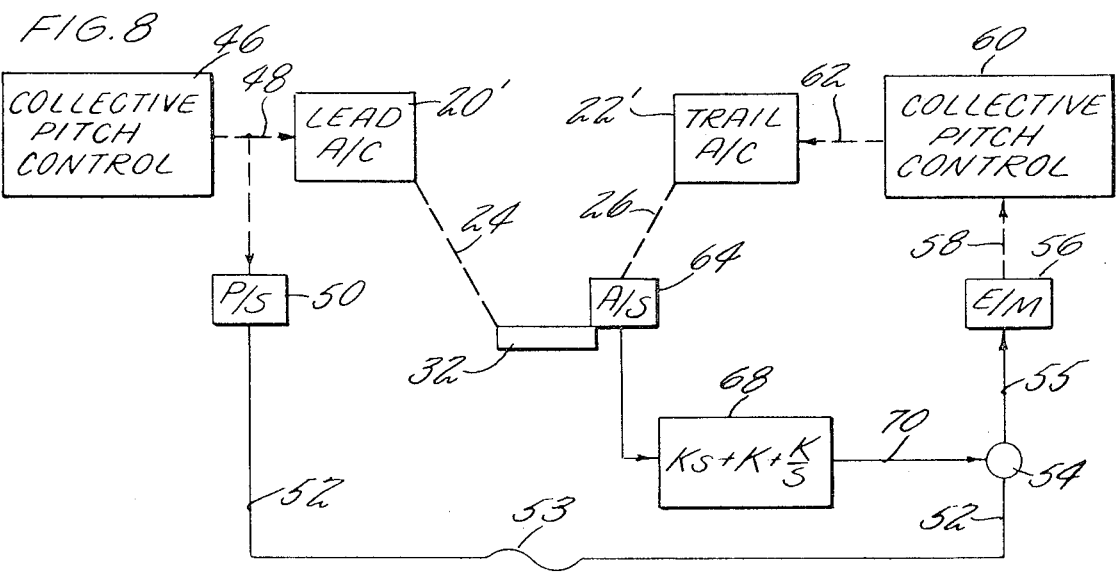
FIG. 8 is a schematic block diagram of a direct lift control which may be used in a dual lift aircraft control system.

Referring now to FIGS. 1-3, a pair of helicopters 20, 22 each support a respective cable 24, 26 connected to opposite ends 28, 30 of a spreader bar 32, which supports, by means of equal length cables 34, 36, a load 38 to be shared by the helicopters 20, 22. As is viewed in FIGS. 1-3, the helicopters 20, 22 are shown hovering (with no velocity in any direction). As seen therein, the lead helicopter 20 is at an altitude slightly less than the trailing helicopter 22. This is to facilitate a comfortable viewing angle for the pilot of the trailing helicopter 22. Additionally, a standard formation includes the trailing aircraft at a higher altitude than the leading aircraft. Also, it is essential that the trailing aircraft not be at too low an altitude relative to the leading aircraft due to the effects of downwash from the leading aircraft which could alter the stable flight pattern of the trailing aircraft.

As is illustrated in FIGS. 1-3, the cables 24, 26 are at right angles with respect to the bar 32. This is essential in order to equally share the load between the two helicopters. Regardless of the maneuvering of the helicopters, this characteristic continues to be true: if the cables 24, 26 are not at substantially right angles to the bar 32, then the load carried by each helicopter will be altered proportionately.

Referring to FIG. 4, the case of forward flight of the helicopters (in contrast with the hovering of FIGS. 1-3) requires that each helicopter be tilted due to the flight characteristics of the helicopter, as is well known, and due to drag forces opposing the motion of the entire load assembly 40 (including the cables 24, 26, 34, 36, the bar 32 and the load 38) which drags behind the vertical projection of the helicopters. During accelerated flight in a forward direction, the angle would be great (perhaps as great as illustrated in FIG. 4); on the other hand, during unaccelerated forward flight, the angle might be somewhat less than that illustrated in FIG. 4. Notice that the cables 24, 26 are still at right angles with respect to the bar 32, so that the load is divided equally between both helicopters (including the drag force load). In FIG. 5 is illustrated what would happen if, instead of maintaining the cables at right angles to the bar 32, the bar 32 were maintained in a horizontal position during forward flight. In FIG. 5, it is assumed that the helicopters are accelerating in forward direction. Due to the drag forces on the load assembly 40, it is seen that the net force is in a direct line with the cable 24 supported by the helicopter 20. That means that the helicopter 20 is supporting the entire load except for the weight and drag of the cables 26 and 36, and half that of the bar 32. This illustrates a primary precept of the present invention: in order for two aircraft to maintain full maneuverability in flight, and equally share a load, it is necessary that supporting cables extending to a spreader bar 32 be maintained substantially perpendicular to the bar at all times.

Conditions which obtain during a turn to the starboad are illustrated in FIGS. 6 and 7. In FIG. 6, a correct turn in accordance with the principles of the present invention is illustrated as maintaining the cables 24, 26 perpendicular to the bar 32. This evenly distributes the load force, including the centrifugal force necessary to accelerate in the turn, between the two helicopters 20, 22. To the contrary, FIG. 7 illustrates the condition which would obtain if the bar 32 were maintained in a horizontal position as each helicopter tilted to make the turn. This condition is substantially identical to that illustrated in FIG. 5; that is, the combined centrifugal force and gravity vector of the load 38 is very nearly in a straight line with the cable 24 supported by the helicopter 20. Therefore, the helicopter 20 will be carrying nearly all of this load in direct proportion to the angle by which the load vector is off of the bisector of the bar 32. However, in an incorrectly executed turn as is shown in FIG. 7, the helicopter 22 will none the less maintain the load of its own cables 22, 36 and half of the bar 32. Of course, similar situations obtain with respect to turns to port and decelerations.

Consider momentarily operation of the helicopters 20, 22 under total manual control while attempting to maintain an even balance of load between them. Positioning the two helicopters in a direction substantially perpendicular to the ends of the bar is relatively easy due to the fact that the load is pulling down on the cables and each helicopter is thereby tethered to the end of the bar 32. It is also relatively easy to maintain a relative azimuthal position (as illustrated in FIG. 3) within tolerable limits in the same fashion as that well known type flying formation is maintained. However, to maintain the bar level in its force field (including accelerations and decelerations in forward velocity, and accelerations necessary in turns, in addition to gravitational force) it is necessary, as described hereinbefore, to maintain the cables 24, 26 at right angles to the bar 32 (not just vertically above the ends of the bar), which is difficult to calculate when the net force vector is not vertical. Also it is extremely difficult to control relative elevation or altitude under manual operation, since it is extremely difficult to measure or visually estimate altitudes down to a few feet, as would be necessary to maintain proper orthogonality between the cables and the bar.

The desirable flight characteristics, which are the precepts of the present invention described with respect to FIGS. 1–7 hereinbefore, are achieved in accordance with one aspect of the present invention by means of apparatus, the primary function of which is to maintain relative flight positions of the helicopters 20, 22 with respect to each other and with respect to the bar 32 such that the cables 24, 26 maintain a right angle relationship with the spreader 32.

Because of the flight parameters of a helicopter (that is, using cyclic pitch to tip the helicopter so that it is drawn in one direction or another), the cables 24, 26 always extend in a direction substantially normal to the reference platform of the aircraft (the plane of the fuselage or substantially the plane of the rotor of the aircraft). This is as illustrated in FIGS. 4–7. If the trailing aircraft 22, as seen in FIG. 5, were to experience direct lift (which is achieved by collective pitch in a helicopter), it would fly in the direction of its rotor as illustrated by the arrow 42 in FIG. 5; this would correct the geometry of this situation to that of FIG. 4, without any corrective action being applied to the lead aircraft 20. Similarly, if as illustrated in FIG. 7, the trailing aircraft 22 were provided with a direct lift input (as illustrated by the arrow 44), it would correct the situation so as to be similar to that in FIG. 6. Utilization of aircraft direct lift control to achieve proper operational configuration as illustrated in FIGS. 1–7 is a major feature of the present invention. In one embodiment this is achieved by apparatus of the type illustrated in FIG. 8, but using the angle sensors of FIGS. 9 and 12, as described hereinafter. In FIG. 8, the overall physical dynamics of each aircraft as a body, including its altitude, position, acceleration and mass, are represented by the blocks 20', 22', respectively. Apparatus associated with each aircraft is located on the same side of FIG. 8 therewith. In accordance with one aspect of the present invention, the lead aircraft is operative under manual control, the pilot thereof executing such maneuvers as are called for in a flight plan in the task being achieved in the dual lift mode. The pilot operates the collective pitch control 46 to induce direct lift (up, in the frame of reference to the aircraft). This control is connected by mechanical means 48 (such as push rods, bell cranks or linkage, etc.) to operate the collective pitch adjustment, to change the pitch of all the rotor blades simultaneously so as to cause the aircraft to experience direct lift. The collective pitch control 46 is also directly connected to a position sensor 50 which derives a proportional electrical signal which is conducted by a line 52 downwardly along cable 24, across the bar 32 and upwardly along the cable 26 (both schematically shown otherwise in FIG. 8) and emphasized herein by looping 52' in the line 52, to a summing network 54 in the trailing aircraft. With the aircraft flying in perfect formation, the signal on line 52 is passed through the summing network 54, with no other input, to an outer loop electromechanical actuator 56 which is connected by mechanical means 58 to operate the collective pitch control 60 of the trailing aircraft. It is this control which is mechanically linked by similar means 62 to all of the rotor pitch mechanisms of the trailing aircraft so as to induce direct lift in the trailing aircraft (22'). This form of control of collective pitch on the trailing aircraft allows the trailing aircraft pilot to override the inputs from the leading aircraft, if he should deem it necessary under any given set of circumstances.

The control just described is adequate to accommodate the situation of a direct lift induced in the leading aircraft to induce a corresponding direct lift in the trailing aircraft. However, an additional input to the summing network 54 is required for correction of faulty flight configurations (as in FIGS. 5 and 7 hereinbefore).

To achieve this, the bar 32 has mounted thereon a cable angle sensor 64, which may comprise any suitable means of sensing a displacement of the cable 26 from the normal to the plane in which the bar 32 lies. For instance, the cable angle sensor 64 may comprise a simple potentiometer arrangement as is known in the art (and utilized widely for similar situations, such as sonar buoy hovering operations). The cable angle sensor 64 provides an electrical signal manifestation of the angle on a line 66 for application to a function generator 68 which provides an input to the summing network 54 over a line 70. The function of cable angle ($Ks + K + K/s$) includes the angle ($K$) its rate of change, $Ks$ (where $s$ is the LaPlacian operator equivalent of $d/dt$), and its integral ($K/s$). The constants ($K$) are amplification factors, and are described more fully hereinafter. The $Ks$ term is for damping; and $K$ term is positional to drive the trailing aircraft 22' to a null situation where its cable 26 perpendicular to the bar 32; the $K/s$ term provides long term response to even minute amounts of drift or other long term errors in the system, as well as providing an input in the case where there is a long range direct lift change in the lead aircraft to assist in providing additional lift to the trailing aircraft to help close the gap.

Figure 9:
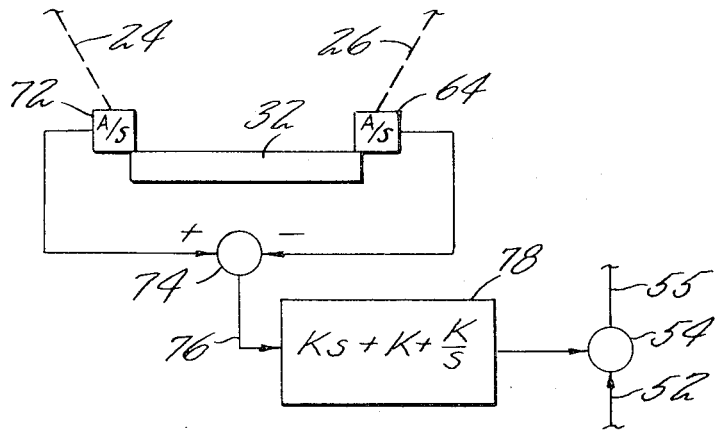
FIG. 9 is a partial schematic block diagram of an alternative angle sensor which may be utilized in the embodiment of FIG. 8 in accordance with one embodiment of the invention.
Figure 10:
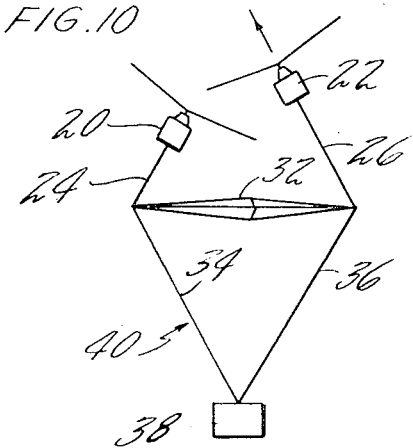
FIG. 10 is a simplified front view illustration of a dual lift helicopter operation with the aircraft located too close together laterally.
Figure 11:
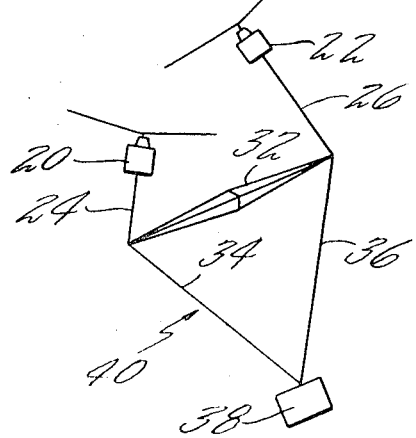
FIG. 11 is a simplified front view illustration of a dual lift helicopter operation with incorrect relative elevation of the aircraft.

Thus, the direct lift control illustrated in FIG. 8 provides direct lift to the trailing helicopter, so as to maintain the cable 26 in a position which is perpendicular with respect to the bar 32. Note that, in the embodiment of FIG. 8, all control is supplied solely to the trailing aircraft, and only the angle between the trailing cable 26 and the bar 32 is sensed, as disclosed and claimed in a copending application of the same assignee, filed on even date herewith (Aug. 2, 1971) by J. R. Maciolek, Ser. No. 168,200. This embodiment is ideal in a multi-lift control system employing all the controls (or comparable controls) which are disclosed herein. On the other hand, this aspect of the present invention may be employed in a partial multi-lift control system having only direct lift control, and relying upon manual control for other positioning of the aircraft. In such a case, the embodiment partially illustrated in FIG. 9 may be preferable. Therein, an additional sensor 72 is provided for the forward cable 24 to sense the angle of the cable 24 with respect to the leading end of the bar 32, and the difference between the two angles is taken in a summing circuit 74 so as to provide a signal on a line 76 to a functional unit 78, which provides essentially the same function as the unit 68 of FIG. 8 (except perhaps for a different constant to accommodate the fact that a different angle parameter is being utilized). By utilizing the difference in the angle as a direct lift parameter, a situation which may arise under manual control as illustrated in FIG. 10 would not result in a direct lift. Therein, the two aircraft 20, 22 are flying too close together laterally, which results in an angle in each of the cables. Although this is likely to occur to some degree under manual control, the extent thereof is exaggerated slightly in FIG. 10. However, in the situation of FIG. 10, in straight line flight, direct lift of the trailing aircraft 22 would result in the situation illustrated roughly in FIG. 11. However, this is not corrective, and in fact results in an excess of the load being placed upon the aircraft 22. On the other hand, since the angles are equal in the situation in FIG. 10, the aircraft merely flying too close together, the embodiment in FIG. 9 would provide no direct lift input to correct the situation, thereby giving the operator of the trailing aircraft time to alter his general position with respect to the lead aircraft 20 so as to correct the situation of FIG. 10 under manual control. Still another embodiment of this aspect of the invention is illustrated in FIG. 12, wherein optical (or other radiation) detection of the angle of the lead aircraft with respect to the reference platform of the trailing aircraft, corrected for pitch and roll by the vertical gyro, provides substantially the same information as the embodiment of FIG. 9. In FIG. 12, the lead aircraft 20 may be provided with a pulsed electromagnetic radiation emitter 80 which operates a position sensitive device 82 on the trailing aircraft 22, the sensor 82 being positioned so as to supply a null when the angle between the two aircraft is the desired angle for the proper relative elevation and perpendicular relationship with respect to the bar 32. The sensor 82 may provide a signal on the line 84 to a summing unit 86 which subtracts the effects of pitch and roll supplied thereto as electrical signals on lines 88, 90 from the vertical gyro 92 of the trailing aircraft. The output of the summing unit 86 appearing on the line 76' may be utilized in the same fashion as illustrated in FIG. 9. The exact nature of the type of sensing to be utilized may depend on such factors as choice between a complete control system as is disclosed herein, and utilization of direct lift control only (with other positioning in the twin-lift operation being achieved by manual control).

The particular constants which may be provided in the function generator 78 of FIG. 9, are all determined in dependence upon a particular utilization of the present invention. The constants for all of the circuits herein are determined by a stability analysis of the load system in conjunction with the operating characteristic of the aircraft involved. Factors that vary the values of the constants which are determinable by a stability analysis of the load system are the length of the bar, the lengths of the cables, the relative positioning desired for the aircraft, and the load itself. Adjustability between constants is desirable for various load situations. However, as described briefly hereinbefore, it should be understood that a wide range of load situations would not normally be anticipated by a twin-lift system of the type disclosed herein due to the fact that loads less than half of the maximum load achievable by both aircraft would normally be handled by a single aircraft because of the inherent simplicity, safety and reliability of a single lift situation. Therefore, the range of dual lift load is from maximum to roughly half of maximum, and the increments therein may be fairly broad so that a wide range of constants is not required.

Figure 13:
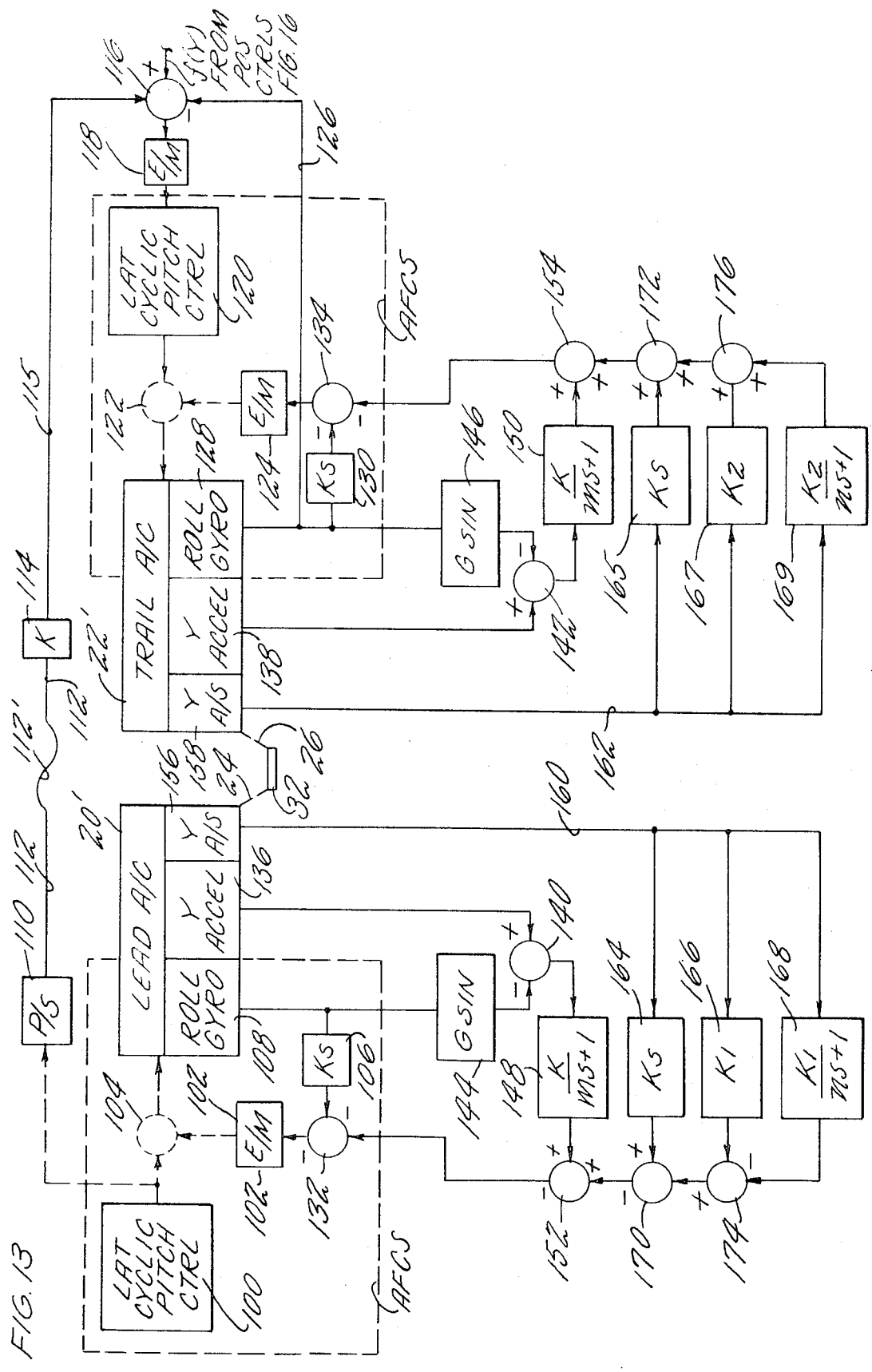
FIG. 13 is a schematic block diagram of lateral (or roll) cyclic pitch controls in accordance with one embodiment of the present invention.

In FIG. 13, the lateral or roll cyclic pitch controls for both the lead aircraft 20' and the trailing aircraft 22' include modifications to the inner or stability control loop. The trailing aircraft has modifications to the outer or general control loop. The controls normally found on direct lift aircraft (such as helicopters) are illustrated within dotted lines designated AFCS (automatic flight control system). Lateral cyclic pitch controls of this type, as well as the longitudinal and collective pitch and other basic controls for a helicopter, are illustrated in an automatic flight control system disclosed in U. S. Pat. No. 3,071,355, FLIGHT CONTROL SYSTEM, issued to E. S. Carter, Jr. on Jan. 1, 1963 and assigned to a common assignee herewith. As described hereinbefore, the pilot controls the lead aircraft, subject only to inner loop stability controls and inner loop controls relating to the present invention. The pilot, in operating a four-way cyclic pitch control stick, can control lateral and longitudinal motion of the aircraft by inducing cyclic pitch into the rotor blades. That portion of the control stick input which relates to cyclic pitch control for lateral motion is designated as the lateral cyclic pitch control 100. Movement of the control 100 is combined with a mechanical input from an electromagnetic actuator 102 in any suitable mechanical motion combining means 104 (which may comprise any suitable form of pushrods, bell cranks, linkages, and so forth), to control the cyclic pitch of the rotors within the aircraft 20' so as to cause lateral tilting of the aircraft to port or starboard. All of this is well known in the art as exemplified by the aforementioned Carter patent. In the description of FIG. 13, the aircraft is assumed to be in an orthogonal coordinate system with the X coordinate equal to the heading of the aircraft, the Y coordinate being in the plane with the X coordinate but lateral (to starboard), and the Z coordinate perpendicular to the X–Y plane and downward with respect to the aircraft. Thus, roll of the aircraft induces lateral motion in the Y direction. In a basic automatic flight control system of the type known to the art, the electromagnetic actuator 102 responds directly to a function generator 106 which provides the rate of roll as sensed by the roll gyro 108 of the aircraft, which is applied in an opposite sense, by the electromagnetic actuator 102 to the mechanical motion of the lateral cyclic pitch control 100 so as to counteract the manual motion induced by the pilot, thereby to cause the aircraft to roll at nearly constant rate. This is a form of stability normally provided by the inner loop of aircraft of this type in accordance with the teachings of the prior art.

In accordance with the present invention, motion of the lateral cyclic pitch control 100 is also coupled to a position sensor 110 to generate an electrical signal on a line 112 which is a manifestation of the position of the control 100. The line 112, similar to the line 52 in FIG. 8, extends down the cable 24, across the bar 32 and up the cable 26 to the trail aircraft, as emphasized herein by the loop 112' in the line 112. The signal on the line 112 is amplified by an amplifier 114 and applied over a line 115 to an electrical summing unit 116, the output of which is converted by an electromechanical actuator 118 to drive the lateral cyclic pitch control 120 of the trailing aircraft. The control 120, except for the fact that it can be driven by the electromechanical actuator 118, is the same as the control 100 and others known in the prior art. Its output is a mechanical motion which has combined therewith, in a suitable means 122, a mechanical input from an electromechanical actuator 124 which responds to the inner loop or stability portion of the automatic flight control system of the trailing aircraft. In manual operation of an aircraft, the pilot controls the aircraft affirmatively while viewing instruments to cause the aircraft to return to a horizontal position after executing turns and or elevation changes. In order to permit hands-off flying of the trailing aircraft in accordance with the present invention, the outer or primary control loop of the trailing aircraft receives, at the summing unit 116, an electrical signal on a line 126 indicative of the absolute roll attitude of the aircraft as developed by a roll gyro 128. This is the same sort of roll gyro as the roll gyro 108 and as utilized in the automatic flight control systems of aircraft of this type known to the prior art. Although not illustrated herein, the lead aircraft 20 may also have gyro inputs to cyclic pitch to allow automatic control over horizontal position. The roll gyro 128 will provide no signal whatsoever when the trail aircraft is perferctly horizontal with respect to the earth; however, if for some reason the aircraft gets out of the horizontal position (without a strong signal on the line 115 causing it to do so) the sense of the signal on the line 126 is such as will cause the electromagnetic actuator 118 to vary the lateral cyclic pitch control 120 so as to return the aircraft to an upright position. Although rate control is normally provided in the loop of the automatic flight control system, the rate control would stop the roll, but not correct it; that is why the additional input from the roll gyro to the outer loop summing unit 116 is required. The rate of roll is applied by an amplifier 130 to the electromagnetic actuator 124 so as to supply roll stability as described with respect to the lead aircraft, hereinbefore. The summing unit 116 also receives information from FIG. 16, which is a function of the deviation of the trail aircraft in its Y direction from its correct position in the desired formation (as illustrated in FIG. 3). The nature and function of this input is described more fully with respect to FIG. 16, hereinafter; its effect on the lateral cyclic controls, however, is to cause the change in cyclic pitch so as to move the aircraft in the Y direction to reposition it in a correct position in the desired formation.

Thus there has been described with respect to FIG. 3 thus far, the lateral cyclic pitch controls which comprise the basic inner loop for both the leading and the trailing aircraft, and the outer control loop of the trailing aircraft being slaved to the manual control of the lead aircraft.

In each of the aircraft 20, 22, the electromagnetic actuators 102, 124 in the inner loop of the lateral cyclic controls, receive inputs from respective summing units 132, 134 which include inputs in addition to those representing roll gyro rate from the amplifiers 106, 130. The other inputs to the summing units 132, 134 relate to positional stability and stability of the cables 24, 26. Specifically, acceleration in the Y direction is sensed by Y accelerometers 136, 138, the signals from which are applied to respective summing units 140, 142. Because of the fact, as is known in the art, that any roll of the aircraft will provide a small gravitational component in the Y direction of the inertial reference platform of the aircraft, the summing units 140, 142 each receives inputs relating to the sine of the roll angle from respective functional units 144, 146 which subtract, from the Y acceleration, a value equal to gravity times the sine of the roll angle. The resulting output from each of the summing units 140, 142 comprises a signal manifestation of true Y component of acceleration in the inertial reference plane of the aircraft. These signals are applied to respective low pass filters 148, 150 which filter out high frequency noise, vibrations, and so forth. The output of the filters 148, 150 are applied to respective summing units 152, 154 so as to apply to the summing units 132, 134, negative signals which mitigate against lateral cyclic pitch in an amount proportional to the acceleration of the aircraft in the Y direction. Thus, the outputs of the filters 148, 150, provide to each aircraft, through its respective inner loop, stability against lateral acceleration.

Stability of the load itself is also provided for each aircraft in FIG. 13. In each aircraft, the related cable 24, 26 preferably extends downwardly out of the aircraft from a cable winch (of the type known to the prior art). In doing so, the cable passes a pair of spring loaded cable position sensors, one oriented in the X-Z plane so as to sense motion of the cable in the X direction, and one oriented in the Y-Z plane so as to sense motion in the Y direction. The sensing arms may be connected to potentiometers to generate electric signals proportional to angles of the cable in the respective plane; or, other suitable cable sensing means may be utilized. In FIG. 13, each aircraft includes a Y direction cable angle sensor 156, 158 for sensing the angle of the related cable 24, 26 with respect to the Y-Z plane only. Signals indicative of the respective angle are applied over related lines 160, 162 to a related series of functional blocks 164–169. The blocks 164, 165 provide signals to a pair of summing units 170, 172 which are a function of the rate of change of the angle, such signals being utilized for damping purposes in a well known fashion. This serves to prevent pendular motion of the load. The functional blocks 166, 167 provide signals to related summing units 174, 176 which are a function of the absolute angle of the related cable with respect to the aircraft, which signals are utilized to cause the aircraft to move laterally so as to straighten up the cable in the lateral plane, thereby tending to maintain the cable perpendicular to the related aircraft. The functional blocks 168, 169 employ the same constant as the related one of the functional blocks 166, 167 but provide the angle-limited integral of the angle; these are log filters, with a time constant of "n". Thus, the functional blocks 168, 169 initially provide no output, but after several time constants, provide exactly the same output as the related functional blocks 166, 167, as disclosed and claimed in the aforementioned copending application. Thus, if there is an additional change in the position of the related cable 24, 26 with respect to the related aircraft reference frame 20', 22', there is a commensurate output from the related amplifier 166, 167 which tends to cause the related aircraft to move laterally to remove the lateral angle from the cable 24, 26. However, if the angle is not removed, in a matter of seconds, then this fact is indicative of a maneuvering of the aircraft which requires that there be a net lateral angle between the aircraft itself and the cable 24, 26 related thereto. Such a case occurs in the case of making a turn, as is illustrated in FIG. 6 hereinbefore. Although it appears in FIG. 6 that the entire formation has been moved into an angle with respect to the horizontal, in fact, the aircraft are more nearly horizontal than is the remainder of the formation (such as the spreader bar 32). Thus, to maintain the formation of FIG. 6, the aircraft will be at a slight lateral angle with respect to their respective cables, since as the turn is made, the aircraft commence the turn and the load always lags behind the aircraft in making the turn due to drag imposed thereon and inertia. This small angle is maintained by the fact that the limited integral units 168, 169 cancel out the amplifier units 166, 167 after several time constants, to allow the cables to seek their own level in a maneuver. The small actual lag is equivalent to the lag built into the limited integral functional units 168, 169.

The manner of arranging the functional blocks and summing units in FIG. 13 may be altered to provide the same results in simpler configuration, if desired.

Figure 14:
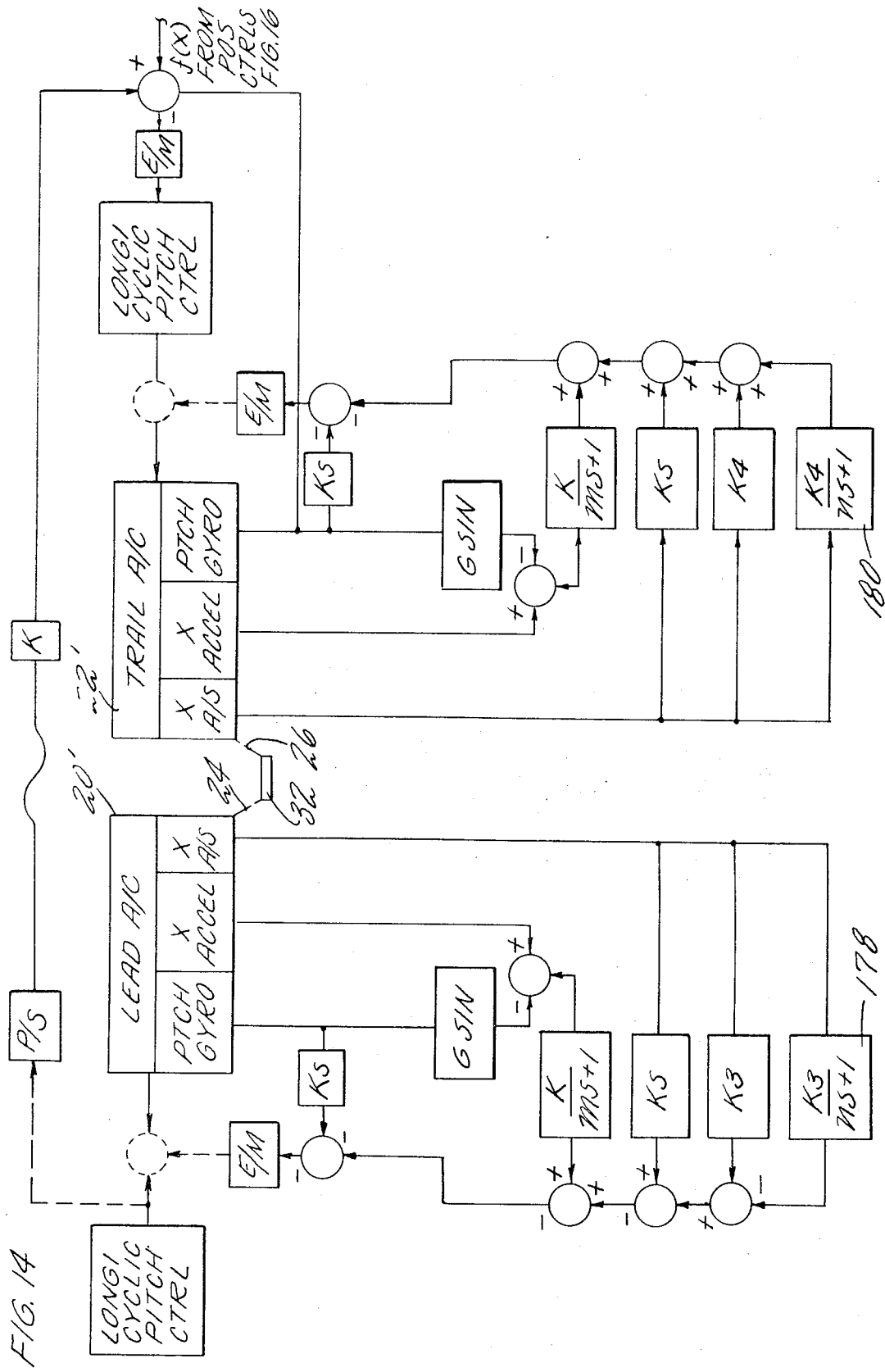
FIG. 14 is a schematic block diagram of longitudinal (or pitch) cyclic pitch controls in accordance with one embodiment of the present invention.

The longitudinal or pitch cyclic pitch controls illustrated in FIG. 14 are identical to the lateral or roll cyclic pitch controls illustrated in FIG. 13, with the exception that the values of the constants may be different and that all of the parameters therein relate to the longitudinal, or pitch motion, and to the X direction in the reference frame of the aircraft. Additionally, the limited integrators 178, 180 at the bottom of FIG. 14 provide for drag during accelerations and in forward flight, as illustrated in FIG. 4.

Although it is relatively easy for a pilot to maintain heading of the trailing aircraft substantially the same as the heading of the lead aircraft, in order to maintain a stable positioning of the load with respect to the aircraft while in a stable pattern or formation, the present invention also provides automatic control over heading (or yaw) of the trailing aircraft as illustrated in FIG. 15. Therein, a rotary rudder pedal 182, which varies the collective pitch of the rotary rudder to alter the heading control for the lead aircraft 20, is mechanically connected to a position sensor 184 which provides a signal on a line 186 indicative of pilot-induced motion of the rotary rudder pedal 182. The line 186 extends downwardly on the cable 24 across the bar 32 and upwardly on the cable 26, as is illustrated herein by the loop 186' in the line 186, and is passed to an amplifier 190 in the trailing aircraft for application to a summing unit 192. The summing unit 192 operates an electromechanical actuator 194 so as to operate the rotary rudder pedal 196 of the trailing aircraft, the output of which is mechanically coupled to the rotary rudder (or tail rotor) of the trailing aircraft 20'. Thus, motion of the rudder control 182 in the lead aircraft induces a similar motion in the rudder control 196 of the trailing aircraft. Each of the aircraft 20, 22 are provided with rotary rudder inner loop controls, which utilize an electric signal from a related gyro compass 198, 200, indicative of the heading of the aircraft, passed through a differentiator 202, 204 to an electromechanical actuator 206, 208 to provide a mechanical input to motion combining means 210, 212 so as to stabilize changes in heading induced by motion of the rudder pedal 182, 196.

Herein, the letter W designates angle, such as heading, with suitable subscripts to indicate heading of the lead aircraft, the trailing aircraft, the bar, the error between the lead aircraft heading and the bar heading, the desired primary angle of the formation, etc. Thus, the heading of the lead aircraft is designated in FIG. 3 as $W_L$ the trailing aircraft as $W_T$, and the bar as $W_B$, and the error between the lead aircraft and the trailing aircraft as $W_E$. In the heading controls of FIG. 15, the heading of the trailing aircraft ($W_T$) on a line 213 is subtracted from the heading of the lead aircraft ($W_L$) on a line 214 by a summing unit 215. The line 214 extends down the cable 24, across the bar 32, and up the cable 26 as indicated by the loop 214' in the line 214. The difference in headings ($W_E$) is applied to a functional block 216 (which is identical to the functional block 68 in FIG. 8, except that different constants may be utilized therein). This block generates an output signal which comprises absolute difference in heading, the rate of change of difference of heading, and the accumulation of heading differences by utilizing the Ks, K, K/s functions as described hereinbefore. The output of the block 216 is applied over a line 217 to the summing unit 192 so as to provide corrective outer loop control over the heading of the trailing aircraft in response to the actual heading of the lead aircraft. Thus, the outer loop heading control of the trailing aircraft is responsive not only to commands made by the pilot of the leading aircraft to change heading, but, in accordance with the invention of said copending application, differences in the response of the two aircraft are accommodated by functions of the difference in actual heading between the two aircraft.

It should be noted that in the case of the heading controls of FIG. 15, there is no modification to the inner loop of either aircraft; the changes required for this invention are simply command (and relative heading, if desired) control over the outer loop of the trailing aircraft in response to commands in (and actual relative heading of, if desired) the lead aircraft.

Maintenance of a desired formation is assisted, in accordance with this invention, by a means of position controls illustrated in FIG. 16. These controls are responsive to heading signals which are derived in FIG. 15. A summing unit 220 responds to the lead aircraft heading ($W_L$) from the gryo compass 198, and the bar heading ($W_B$) derived from a gyro compass 222 mounted directly on the spreader bar 32. The gyro compass 222 is so mounted with respect to the bar 32 that a relative heading of zero is defined as being perpendicular to the longitudinal axis of the bar. By doing this, as is described more fully hereinafter, it is possible to alter the primary angle ($W_D$, FIG. 3) of a desired formation, quite simply, without altering the position of the gryo 222 on the bar 32. The bar gyro compass 222 is connected by wiring 223 which extends along the bar to the cable 24 and upwardly along the cable 24 to the lead aircraft 22.

Referring now to FIG. 3, a desired formation is therein illustrated as having the bar 32 oriented at about 30° with respect to the heading of the formation. The heading ($W_L$) of the lead aircraft 20, the motion heading ($W_M$) of the bar 32 and the heading ($W_T$) of the trailing aircraft 22 are all equal, when in the desired formation, without turns. The actual heading of the bar ($W_B$) differs from the direction of motion of the bar ($W_M$) by the desired primary angle of the formation ($W_D$). In other words, when in proper formation, the motion of the bar ($W_M$) equals the heading of the bar ($W_B$) plus the desired formation angle ($W_D$). The desired distances in the X and Y direction ($X_D$, $Y_D$) are related to the length of the bar (L) and the desired primary angle of the formation ($W_D$) as follows:

$$X_D = L\cos W_D, \text{ AND} \qquad (1)$$

$$Y_D = L\sin W_D \qquad (2)$$

To find the X and Y errors in the formation, so that these errors can be utilized in the longitudinal and lateral cyclic controls, respectively, to correct the formation to that which is desired, consider first the error, $X_E$, in the X direction:

$$X_E = X - X_D \qquad (3)$$

$$= L\cos(W_L - W_M) - L\cos W_D \qquad (4)$$

$$= L\cos[W_L - (W_B + W_D)] - L\cos W_D \qquad (5)$$

$$= L\cos(W_L - W_B - W_D) - L\cos W_D \qquad (6)$$

so $$X_E = L\cos[(W_L - W_B) - W_D] - L\cos W_D \qquad (7)$$

Similarly, the error in the Y direction is given as:

$$Y_E = L\sin[(W_L - W_B) - W_D] - L\sin W_D$$

In FIG. 16, a signal indicative of the error in the X direction ($X_E$) is provided on a line 230, and a signal indicative of the error in the Y direction ($Y_E$) is provided on the line 232. For each of the equations (7) and (8), the term ($W_L - W_B$) is provided on a line 234 to a summing unit 236 which subtracts the term $W_D$ which is provided thereto on the line 238 from a position sensor 240 which is mechanically adjusted by a $W_D$ control input 242. In other words, primary angle desired for the formation is manually adjusted by adjusting a knob on a potentiometer or other suitable position sensor 240 so as to supply a desired angle input to the summing network 236. The net term [($W_L - W_B$) − $W_D$] is thus provided by the summing unit 236 on the line 244. Then, a pair of functional units 246, 248 provide L times the cosine and sine, respectively, of this net angle to related summing units 250, 252. Similarly, identical functional units 254, 256 provide L times the cosine and sine of the desired angle ($W_D$) on the line 238 to the summing units 250, 252, thereby to derive the X and Y errors in accordance with equations (7) and (8) as described hereinbefore. The X and Y errors on the lines 230, 232 are converted to damped positional errors by related functional blocks 258, 260: in each of the units 258, 260 the Ks term will immediately create an input to stop the change of error in X or Y and the K term will tend to remove the error once the change has been eliminated. These signals are applied, in accordance with this invention and as described hereinbefore, to FIGS. 14 and 13, respectively, so as to cause direct, outer loop inputs to the trailing helicopter to tend to maintain correct X and Y positioning of the trailing aircraft in the desired formation illustrated in FIG. 3.

Although illustrated herein with the summing unit 220 and the position controls of FIG. 6 being disposed in the lead aircraft 20, they could obviously be equally well disposed in the trailing aircraft 22.

Figure 18:
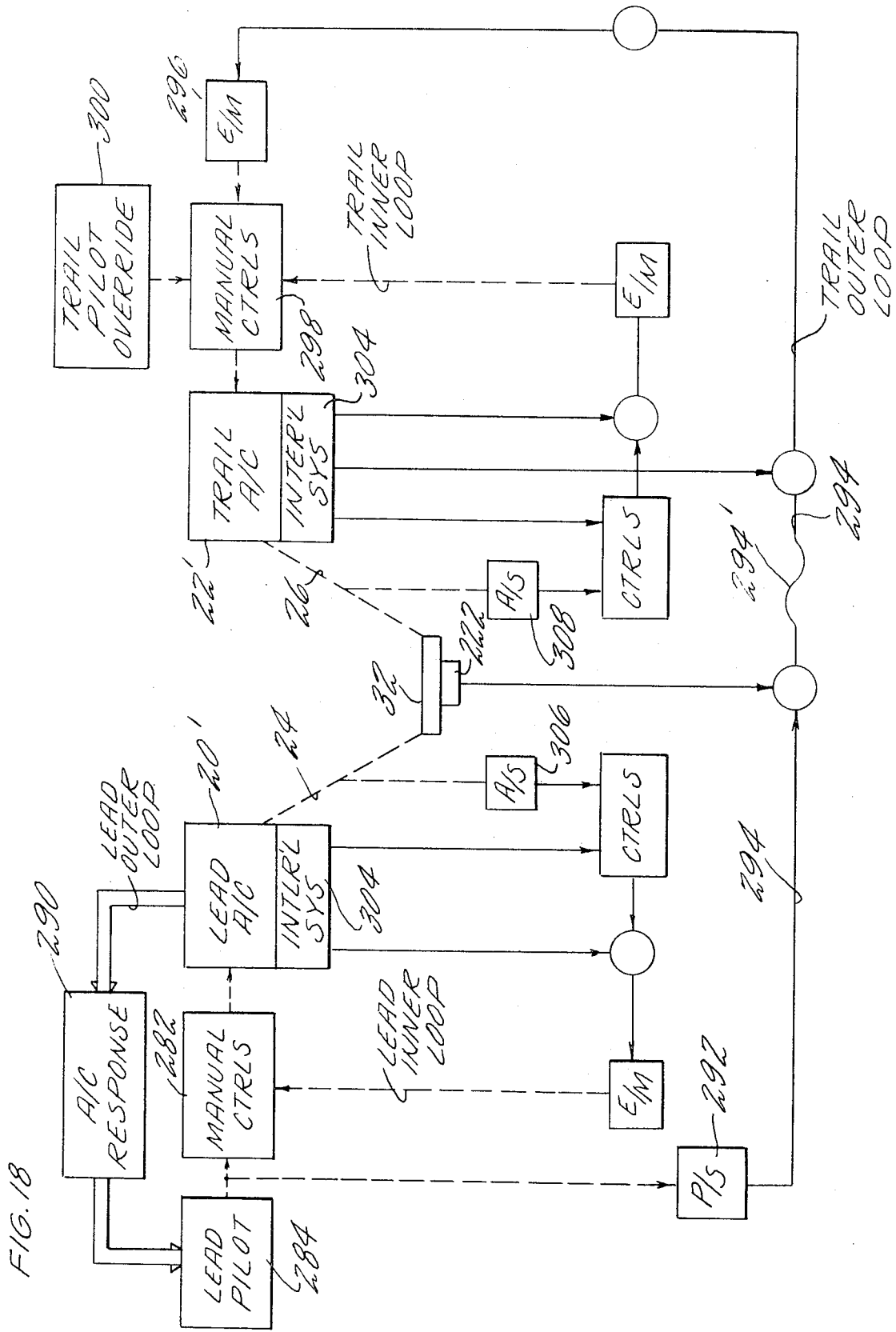
FIG. 18 is a simplified schematic block diagram illustrating dual lift aircraft control concepts in accordance with an embodiment of the present invention.

The embodiments of the invention described hereinbefore can be summarized, as illustrated in FIGS. 17 and 18. FIG. 17 illustrates the well known control loops of a single aircraft of a type which may be utilized in the system in acordance with this invention. In FIG. 17, the aircraft 280 is controlled by manual controls 282 in response to movement thereof by the pilot 284. However, the controls are modified by mechanical inputs provided thereto by an electromagnetic actuator 286 which responds to the inertial system 288 of the aircraft. Thus, an inner control loop includes modifications to pilot movements. The outer or general control loop includes the pilot, the manual controls 282, the actual changes in the control surfaces of the aircraft 280, the response of the aircraft (designated by the block 290) as well as the pilots observation of the response; the action of the pilot, in response to his observations, closes the outer loop of the control system.

One aspect of the present invention is easily compared directly with the inner and outer loops of the known aircraft in FIG. 17. In FIG. 18, the lead aircraft 20' has the same outer loop including the aircraft response 290, the pilot 284 and the manual controls 282. However, the outer loop of the trailing aircraft differs significantly since it comprises simply a response to the motion of the lead pilot 284 as a result of position sensors 292 electrically connected by wiring 294 down the cable 24, across the load 32 and up the cable 26 (as indicated by 294') to electromagnetic actuators 296 which operate respective manual controls 298 in the trailing aircraft 22'. The trailing aircraft pilot 300 may override the manual controls 298 if desired. The outer loop of the trail aircraft also includes functions of relative heading of the lead aircraft with the load and inertial inputs to maintain the trailing aircraft in a correct horizontal position in a desired formation. An additional aspect of the present invention is that each of the aircraft include, in addition to the original inner loop controls (such as illustrated in FIG. 17), further inner loop controls in response to the inertial system 302, 304 of the respective aircraft and in response to angle sensors 306, 308 relating to angles between the cables extending between the aircraft and the spreader bar 32. The additions to the respective inner loops provide, with respect to each aircraft, formation stability and load stability.

Thus, in accordance with the present invention, an outer control loop for an aircraft includes control functions over the physical positioning of the manually movable controls utilized by the pilot of an aircraft to induce responses therein; an inner loop control system includes control inputs utilized in motion combining means to alter the actual motion of control surfaces of the aircraft from those that would be caused by the motion of the manual controls, in amounts which relate to stabilizing the aircraft, both in its inertial reference and in its relationship to a load being supported by a plurality of said aircraft. One aircraft is the lead or master aircraft and its outer control loop is unmodified, relying solely on the pilot for the operation of the manual controls thereof, but its inner control loop modifying the motions of control surfaces induced by the manually movable controls as a result of inertial, positional, and relative load position stabilizing inputs. The trailing or slave aircraft, on the other hand, has motion of the first aircraft coupled into its outer control loop, so that the pilot thereof, in the absense of an override due to special circumstances, observes the manually movable controls moving automatically in response to motions imparted thereto by actuators. In addition to coupling motion of the lead aircraft controls into the trailing aircraft controls, the trailing aircraft outer loop controls include pitch and roll stabilization, as well as direct lift to maintain a proper altitude with respect to the load. The trailing aircraft has the same inner loop inputs for stabilizing the absolute position of the aircraft and its relationship to the load, as does the leading aircraft. Thus, the outer loop of the trailing or slave aircraft includes only the slower, general positional inputs of the type usually imparted thereto by the pilot, and the inner loop includes the more rapid stabilizing inputs which the pilot normally is not able to compensate for and does not wish to sense in the stick.

The embodiments herein have been described primarily with respect to helicopters of the single main rotor type, having a main rotor capable of cyclic and collective pitch and having a rotary rudder. However, it should be obvious from the functional descriptions herein, that the controls herein, modified to suit the given characteristics of an aircraft, may be utilized for multiple-aircraft lifting of loads by means of aircraft other than helicopters. Additionally, the embodiment herein is described with respect to a dual lift helicopter operation, but it should be understood that the system herein may be employed in operations involving more than one trailing or slave aircraft. The manner in which the utilization of more than one slave aircraft modifies the responses required in other aircraft is accommodated in the stability analysis of the total system including as many aircraft as desired. This naturally becomes more complex for any greater number of aircraft; however, the principles are the same and the analyses to be utilized are the same as for the dual-lift case, which is disclosed herein only for simplicity. Also, the aircraft may be coupled by wireless means, such as used in telemetry.

Thus, although a multiple lift aircraft control system in accordance with the present invention has been described with respect to preferred embodiments thereof, it should be understood by those skilled in the art that the foregoing and various other changes and omissions in the form and detail thereof may be made therein without departing from the spirit and the scope of the invention.

Having thus described typical embodiments of our invention, that which we claim as new and desire to secure by Letters Patent of the United States is:

1. A control system for controlling a plurality of aircraft supporting a common load, each aircraft including an inertial system and an outer loop control system in which motion of manually movable controls alters the position of control surfaces of the aircraft causing positional response in the aircraft, and each including an inner loop control system responsive to the related inertial system for automatically stabilizing the related outer loop control system, comprising:

means coupling the manual controls of a first one of said aircraft to automatically move the manual controls of a second one of said aircraft in response to motion imparted to said first aircraft manual controls;

means disposed in each aircraft for sensing a positional relationship of said common load to the related one of said aircraft; and signal means in each of said aircraft responsive to the related one of said positional relationship sensing means and connected to the related one of said inner loop control systems for generating signals operative through said inner loop control system to modify the related outer loop control system in a manner to tend to stabilize the positional relationship of the related one of said aircraft with respect to said common load.

2. The system according to claim 1 wherein:

said load is supported by support cables extending generally downward from each of said aircraft;

said positional sensing means comprise means for sensing the relative angle in the lateral direction and the relative angle in the longitudinal direction of the related one of said support cables with respect to the reference platform of the related aircraft;

and said signal means comprise means responsive to respective ones of said sensing means to respectively modify the lateral and longitudinal outer loop control system of said aircraft in response thereto.

3. The system according to claim 2 wherein said modification is in response to at least the rate of change of the related angle.

4. A system according to claim 1 additionally comprising meas in each of said aircraft responsive to the related one of said inertial systems and connected to the related one of said inner loop control systems for stabilizing the related outer loop control system in a manner tending to stabilize the position of the related aircraft.

5. The system according to claim 1 wherein said outer loop control system of each aircraft includes control over longitudinal cyclic pitch, lateral cyclic pitch and collective pitch of a main rotor, and includes collective pitch of a rotary rudder.

6. The system according to claim 5 wherein said inner loop control system of each aircraft includes stabilization in respect of pitch rate, roll rate, lateral acceleration, longitudinal acceleration, and rate of heading change.

7. The system according to claim 1 wherein the outer control loop of said second aircraft includes pitch and roll inputs from the inertial system of said second aircraft, thereby providing control over the horizontal stability of said one aircraft.

8. The system according to claim 1 additionally comprising:

an inertial system on said load;

and means connected to the inertial systems of said first aircraft and said load and responsive to the difference between the heading of said first aircraft and the heading of said load for modifying the outer loop control system of said second aircraft to tend to maintain the relative position of said second aircraft with respect to said first aircraft as will provide a desired relative heading of said load with respect to said aircraft, in a desired formation.

9. A multiple lift aircraft control system, comprising:
a plurality of aircraft;
a support cable extending generally downwardly from each of said aircraft;
a spreader bar connected, at a related one of a plurality of points, to the downmost end of each of said cables;
a load suspended from said spreader bar in a manner to load the respective points of said spreader bar substantially equally;
a plurality of means, one mounted on a first one of said aircraft and one mounted on said spreader bar, each providing a signal manifestation of the heading of the body on which it is mounted;
and means responsive to the signal manifestations provided by said heading means for controlling the lateral and longitudinal motion of a second one of said aircraft, thereby tending to control the position of said second aircraft to maintain said second aircraft in a correct position in a desired formation.

10. A multiple aircraft load lift system comprising:
a plurality of aircraft, at least a first one of said aircraft having a direct lift capability and a related control system therefor;
a support cable extending downward from each of said aircraft;
a spreader bar connected to the downward end of each of said support cables;
means for sensing a first angle between said spreader bar and the one of said support cables relating to said first aircraft;
means for sensing a second angle between a second one of said support cables and said spreader bar;
means responsive to said angle sensing means to generate a signal in response to the difference between said first and second angles; and
lift means responsive to said difference signal means for inducing a change in the direct lift of one of said aircraft in response to said difference signal, said change in direct lift causing motion of said one aircraft in a manner to tend to drive said first angle to 90°.

11. A multiple aircraft load lift system comprising:
a plurality of aircraft, at least a first one of said aircraft having a direct lift capability and a related control system therefor, and an attitude reference platform;
a support cable extending downwardly from each of said aircraft;
a spreader bar connected to the downward end of each of said support cables;
means for sensing the angle in the vertical between said reference platform and a second one of said aircraft and for generating a signal indicative thereof;
lift means responsive to said angle signal means for inducing a change in the direct lift of said first aircraft in response to said angle signal, said change in direct lift causing motion of said first aircraft in a manner to tend to drive said angle to a desired angle.

12. A control system for controlling a plurality of aircraft supporting a common load supported by a spreader bar, said spreader bar having a point relating to each of said aircraft, each of said aircraft including a support cable extending generally downwardly therefrom and attached to the related point on said spreader bar, each aircraft including an outer loop control system in which motion of manually movable controls alter the position of control surfaces of the aircraft causing positional response in the aircraft including direct lift response, comprising:
a plurality of electromagnetic position sensors disposed in a first one of said aircraft, each sensor responsive to a motion of said manually movable controls relating to a given positional response of said aircraft, each for generating an electrical signal manifestation of the related motion;
a plurality of electrical conductors extending from said first aircraft to a second one of said aircraft, each relating to a corresponding one of said signal manifestations;
a plurality of electromechanical actuators disposed in said second aircraft, each connected to a respective one of said electrical conductors, each disposed relative to the manual removable controls of said second aircraft and responsive to a given signal manifestation in the related conductor so as to cause motion therein to induce a response in said second aircraft of the same type and substantially the same magnitude as that in said first aircraft which causes said given signal, whereby manual operation of said first aircraft is electromechanically coupled to correspondingly operate said second aircraft;
a cable angle sensing means disposed on each of said aircraft to sense the angle between said spreader bar and the related one of said cables, each of said angle sensing means developing an electrical signal manifestation of said angle;
difference means responsive to said angle sensing means for generating a difference signal in response to the difference in angle represented by said angle signal manifestations; and
electrical signal combining means connected to said difference means and connected in series with the one of said electrical conducting means relating to said direct lift response and jointly responsive to signals thereon and to said difference signal to operate the related one of said electromechanical actuators, whereby direct lift in said second aircraft is controlled not only in response to direct control motion in said first aircraft, but also in response to the relative angles between the support cables of said aircraft and said spreader bar.

* * * * *